2,863,908
WATER-SOLUBLE ESTERS OF ALKYL ORTHO-XENOXY ACETIC ACID AND POLYOXYALKYL-OLAMINES

Alfred F. Steinhauer, Midland, Mich., assignor to The Dow Chemical Company, Midland, Mich., a corporation of Delaware No Drawing. Application February 19, 1957
Serial No. 641,015

9 Claims. (Cl. 260—473)

This invention concerns new compositions of matter having surface active properties. It relates more particularly to water-soluble esters of alkyl ortho-xenoxy acetic acids and polyoxyalkylolamines.

The new compositions are all soluble in water and have surface active properties. They are useful as wetting agents, emulsifying agents and dispersing agents. The new esters are useful as the active ingredient in the manufacture of cleaning compositions or washing powders.

The compositions are esters corresponding to the reaction product of from one to three gram molecular proportions of an alkyl ortho-xenoxy acetic acid having the general formula:

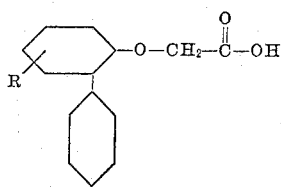

wherein R represents an alkyl radical containing from 9 to 15 carbon atoms, preferably derived from polypropylenes, with one gram molecular equivalent proportion of a polyoxyalkylolamine having the general formula:

$$N[(RO)_n-H]_3$$

wherein RO represents an oxyalkylene radical selected from the group consisting of the oxyethylene and oxy-1,2-propylene radicals and $n$ is an integer from 7 to 36, and in which polyoxyalkylolamine at least one-third of the RO radicals are oxyethylene radicals.

The compositions or esters can be prepared by reacting an acyl halide of an alkyl ortho-xenoxy acetic acid having the above formula with the polyoxyalkylolamine in amounts corresponding to from one to three moles of the alkyl ortho-xenoxy acetyl halide per mole of the polyoxyalkylolamine at temperatures between about room temperature and 100° C. and at atmospheric or subatmospheric pressure.

The alkyl ortho-xenoxy acetic acid, or acetyl halide thereof, to be employed as starting material can be prepared by reacting ortho-phenylphenol with chloroacetic acid to form the corresponding ortho-xenoxy acetic acid (ortho-phenylphenoxy acetic acid) in usual ways, e. g. by reacting sodium ortho-phenylphenate with sodium chloroacetate in aqueous solution at reaction temperatures between 60° and 100° C. and thereafter acidifying the mixture and recovering the ortho-xenoxy acetic acid.

The alkyl ortho-xenoxy acetic acid is prepared by reacting ortho-xenoxy acetic acid with an olefin containing from 9 to 15 carbon atoms, suitably a polypropylene fraction consisting principally of tripropylenes, tetrapropylenes or pentapropylenes, in the presence of an alkylation catalyst such as boron trifluoride while having the reactants dissolved in an inert organic liquid, e. g. carbon tetrachloride or chloroform. The alkylation reaction can be carried out at temperatures between 40° and 70° C. and at atmospheric or substantially atmospheric pressure employing the reactants in amounts corresponding to approximately equimolecular proportions, i. e. one gram molecular proportion of the ortho-xenoxy acetic acid per gram molecular proportion of the olefin.

The alkyl ortho-xenoxy acetic acid is converted to the corresponding alkyl ortho-xenoxy acetyl halide in usual ways, e. g. by reaction of the alkyl ortho-xenoxy acetic acid with thionyl chloride, phosphorus tribromide or phosphorus trichloride, preferably the latter. The reaction is usually carried out at room temperature or thereabout and at atmospheric or substantially atmospheric pressure while having the reactants dissolved in an inert organic liquid such as benzene, toluene, xylene, ethylbenzene, chlorobenzene, etc., and venting gaseous by-products, e. g. $SO_2$, HBr or HCl from the reaction as they are formed. The alkyl ortho-xenoxy acetyl halide is recovered in usual ways, e. g. by heating the reacted mixture to distill and separate the solvent from the product.

The polyoxyalkylolamines to be employed as starting materials can be prepared by reacting or condensing ethylene oxide or propylene oxide and ethylene oxide with mono-, di- or triethanolamine or mono-, di- or triisopropanolamine in the presence of a strong alkali catalyst such as sodium hydroxide or potassium hydroxide, and with the proportion of the alkylene oxide controlled so as to obtain a final product having an average molecular weight between about 950 and 5300 and wherein at least one-third of the total oxyalkylene radicals are oxyethylene radicals. The polyoxyalkylolamine can be one in which all or substantially all of the oxyalkylene groups are oxyethylene groups or a condensation product wherein at least one-third of the oxyalkylene groups are oxyethylene groups and the remainder are oxy-1,2-propylene groups. In brief, the polyoxyalkylolamine starting materials are prepared by reacting ethylene oxide, or 1,2-propylene oxide followed by reaction of ethylene oxide, with an alkanolamine such as monoethanolamine or isopropanolamine in the presence of a small amount of sodium hydroxide or potassium hydroxide as catalyst, e. g. 5 percent by weight or less of the catalyst.

The mixture of the alkanolamine and the catalyst is stirred and heated at temperatures between 80° and 200° C., preferably from 80° to 120° C., and the alkylene oxide added under superatmospheric pressures of up to about 100 pounds per square inch gauge pressure, and at about the rate at which it is consumed in the reaction. The average molecular weight of the polyoxyalkylolamine product is controlled by regulating the proportion of the alkylene oxide fed to the reaction. In making polyoxyalkylolamines containing both oxyethylene groups and oxy-1,2-propylene groups in the molecule, the propylene oxide is preferably first reacted with the mono-, di- or trialkanolamine initially used, followed by the introduction and reaction of ethylene oxide in the desired proportion. The polyoxyalkylolamine starting material may be obtained from any source, it being limited only by the aforementioned requirements that the total number of oxyalkylene groups be between about 21 and 108 and that at least one-third of the oxyalkylene groups be oxyethylene as hereinbefore defined.

In practice, the polyoxyalkylolamine starting material is placed in a suitable reaction vessel, equipped with a stirrer and means for heating or cooling the contents, in the desired amount. It is stirred and maintained at temperatures between about 25° and 100° C., preferably from 60° to 90° C. while adding the alkyl ortho-xenoxy acetyl halide, preferably an alkyl ortho-xenoxy acetyl chloride, in the desired proportion and at about the rate it is consumed in the reaction. HCl or other gaseous by-products are vented from the reaction as they are formed. The alkyl ortho-xenoxy acetyl halide is employed in amounts corresponding to from one to three moles per molecular equivalent proportion of the polyoxyalkylolamine initially used. Upon completing the reaction the mixture is neutralized with an alkali, e. g. by the addition of an aqueous 50 weight percent solution of sodium hydroxide in amount sufficient to bring the mixture to a pH value of 7 or substantially neutral, as determined by test. The products range from mobile to viscous liquids through soft to wavy solids and are usually yellow liquids to yellow or white solids.

The following examples illustrate ways in which the principle of the invention has been applied, but are not to be construed as limiting its scope.

EXAMPLE 1

A. A charge of 681 grams (4 moles) of orthophenylphenol was added to 800 ml. of water at temperatures between 60° and 70° C. The mixture was stirred and 320 grams of an aqueous 50 weight percent solution of sodium hydroxide was added. Thereafter, about 1500 ml. of an aqueous solution containing 402 grams (4 moles) of chloroacetic acid, sodium salt, was added. The resulting mixture was stirred and heated at a refluxing temperature of about 100° C. for a period of 15 hours, then cooled. The solution was added with stirring to an aqueous solution to 500 ml. of water and 200 ml. of concentrated (98 percent) sulfuric acid, then allowed to stand. It separated into an aqueous layer and an organic layer. The organic layer was separated and was washed with one liter of warm water, then separated. There was obtained 883 grams of ortho-xenoxy acetic acid as a soft yellow solid. It was dissolved in 3 liters of carbon tetrachloride, whereupon 30 grams of water separated and was removed. The yield of ortho-xenoxy acetic acid was 853 grams (3.73 moles). The solution of the ortho-xenoxy acetic acid in the carbon tetrachloride solvent was placed in a glass reaction flask equipped with a reflux condenser and stirrer. A charge of 471 grams of a polypropylene fraction boiling at temperatures between 120 and 165° C. and consisting of tripropylenes as the principal component, was added. The mixture was stirred and heated at temperatures between 40° and 50° C. Thereafter, boron trifluoride gas was bubbled into the liquid until it was saturated with the gas. The resulting mixture was heated at temperatures between 65° and 70° C. for a period of 5 hours to complete the reaction. Thereafter, the mixture was washed three times, each with a 2500 ml. portion of water, then was dried and the solvent removed by heating the material to a temperature of 100° C. under reduced pressure. There was obtained 1116 grams of branched chain nonyl or (tripropyl) ortho-xenoxy acetic acid as a viscous brown liquid.

A charge of 944 grams (2.66 moles) of the branched chain nonyl ortho-xenoxy acetic acid and 1350 ml. of benzene were placed in a glass reaction flask equipped with a reflux condenser and stirrer. The mixture was stirred and heated at a temperature of 80° C. A charge of 182.8 (1.33) moles of phosphorus trichloride added over a period of 1 hour. The resulting mixture was heated at refluxing temperatures with stirring for a period of 5 hours, then cooled to room temperature. The solution was decanted from the catalyst residue. The solution was heated to temperatures up to 100° C. under reduced pressure while distilling the solvent from the residue product. There was obtained 998 grams of branched chain nonyl ortho-xenoxy acetyl chloride as a viscous brown liquid.

B. In each of a series of experiments a mixture of the branched chain nonyl ortho-xenoxy acetyl chloride prepared in part A above and a polyoxyalkylolamine as defined in the following table was stirred and heated at a temperature of 80° C. for a period of from 0.5 to 1 hour while venting by-product HCl from the reaction. Thereafter, the mixture was cooled and neutralized by adding a small amount of an aqueous 50 weight percent solution of sodium hydroxide. Surface active properties for the neutralized product were determined on an aqueous solution of distilled water containing 0.1 percent by weight of the product. The procedure for determining the amount of foam was similar to the Ross-Miles foam test. The wetting time was determined by the Draves-Clarkson sinking time test. The surface tension was determined at 25° C. employing a standard tensiometer. Table I identifies the product by giving the

*Table I*

| Run No. | Starting materials | | Product | | | |
|---|---|---|---|---|---|---|
| | Nonyl-xenoxy acetyl chloride, gms. | Polyoxy-alkylol amine, gms. | Color and Form | Foam Height, mm. | Wetting Time, min. | Surface Tension, dynes/ sq. cm. |
| 1 | 15 | a 40.8 | yellow liquid | 48 | 1.46 | 33.1 |
| 2 | 15 | a 20.7 | yellow viscous liquid | 36 | 0.92 | 33.1 |
| 3 | 15 | a 13.9 | ----do---- | 26 | 1.04 | 33.3 |
| 4 | 5 | b 68.0 | yellow soft solid | 50 | 0.60 | 34.8 |
| 5 | 5 | b 33.5 | yellow viscous liquid | 46 | 0.44 | 34.1 |
| 6 | 5 | b 22.4 | ----do---- | 53 | 0.45 | 34.2 |
| 7 | 10 | c 54.0 | yellow liquid | 30 | 1.08 | 35 |
| 8 | 10 | c 26.4 | yellow viscous liquid | 24 | 0.69 | 34.2 |
| 9 | 15 | c 26.5 | ----do---- | 5 | 0.48 | 34.4 |
| 10 | 5 | d 57.0 | yellow liquid | 63 | 0.69 | 34.2 |
| 11 | 5 | d 28.4 | yellow viscous liquid | 60 | 0.53 | 34.2 |
| 12 | 10 | d 38.0 | ----do---- | 55 | 0.47 | 34.1 |
| 13 | 5 | e 47.0 | white waxy solid | 36 | 7.0 | 37.7 |
| 14 | 5 | e 23.4 | ----do---- | 38 | 4.2 | 36.0 |
| 15 | 10 | e 31.2 | ----do---- | 39 | 3.3 | 35.0 | a A polyoxyalkylolamine prepared by reacting approximately 21 moles of ethylene oxide with one mole of monoethanolamine to obtain a product having a molecular weight of 1036 by nitrogen analysis.
b A polyoxyalkylolamine prepared by reacting 85.2 moles of 1,2-propylene oxide with one mole of monoethanolamine followed by condensation of 45.5 moles of ethylene oxide with the product to obtain a final product having a molecular weight of 4830 by nitrogen analysis.
c A polyoxyalkylolamine prepared by reacting 16.2 moles of 1,2-propylene oxide with one mole of monoethanolamine followed by reaction of 22.75 moles of ethylene oxide with the product to obtain a final product having a molecular weight of 1975 by nitrogen analysis.
d A polyoxyalkylolamine prepared by reacting 50.7 moles of 1,2-propylene oxide with one mole of monoethanolamine followed by reaction of 45.5 moles of ethylene oxide with the product to obtain a final product having a molecular weight of 4250 by nitrogen analysis.
e A polyoxyalkylolamine prepared by reacting 89.5 moles of ethylene oxide with one mole of monoethanolamine to obtain a final product having an average molecular weight of 3500 by nitrogen analysis.

amounts of the branched chain nonyl orthoxenoxy acetyl chloride and polyoxyalkylolamine employed in preparing the same. The table identifies the product as to color and physical form and gives the surface active properties determined for the product.

EXAMPLE 2

A. Dodecyl ortho-xenoxy acetic acid was prepared by reacting sodium ortho-phenylphenate with chloroacetic acid, sodium salt, and reacting the ortho-xenoxy acetic acid with a polypropylene fraction boiling at temperatures between 185° and 210° C. and consisting of tetrapropylenes as the principal components, employing procedures similar to those employed in Example 1. The ortho-xenoxy acetic acid was converted to the corresponding branched chain dodecyl or (tetrapropyl) ortho-xenoxy acetyl chloride by reaction with phosphorus trichloride employing procedure similar to that employed in the preceding example.

B. In each of a series of experiments, a mixture of the branched chain dodecyl ortho-xenoxy acetyl chloride and a polyoxyalkylolamine as stated in the following table was stirred and heated at a temperature of 80° C. for a period of one hour while venting by-product HCl from the reaction. Thereafter, the mixture was neutralized with an aqueous 50 weight percent solution of sodium hydroxide and cooled to room temperature. Surface active properties for the product were determined employing procedures similar to those employed in Example 1. Table II identifies the product by giving the amounts of the branched chain dodecyl ortho-xenoxy acetyl chloride and the polyoxyalkylolamine employed in preparing the same. The table also gives the color and physical form of the product and the surface active properties determined for the product.

properties, comprising a water-soluble ester corresponding to the reaction of from one to three gram molecular proportions of an alkyl ortho-xenoxy acetic acid having the general formula:

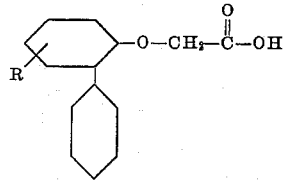

wherein R represents an alkyl radical containing from 9 to 15 carbon atoms, with one gram molecular equivalent proportion of a polyoxyalkylolamine having the general formula:

$$N[(RO)_n—H]_3$$

wherein RO represents an oxyalkylene radical selected from the group consisting of the oxyethylene radical and the oxy-1,2-propylene radical and $n$ is an integer from 8 to 36, and in which polyoxyalkylolamine at least one-third of the RO radicals are oxyethylene radicals.

2. A composition as claimed in claim 1, wherein the alkyl ortho-xenoxy acetic acid is a branched chain nonyl ortho-xenoxy acetic acid.

3. A composition as claimed in claim 1, wherein the alkyl ortho-xenoxy acetic acid is a branched chain dodecyl ortho-xenoxy acetic acid.

4. A composition as claimed in claim 1, wherein the polyoxyalkylolamine contains both oxyethylene radicals and oxy-1,2-propylene radicals.

5. A composition of matter having surface active properties, comprising a water-soluble ester consisting essentially of the reaction product of from one to three gram

*Table II*

| Run No. | Starting Materials | | Product | | | |
|---|---|---|---|---|---|---|
| | Dodecyl ortho-xenoxy acetyl chloride, gms. | Polyoxy-alkylol amine, gms. | Color and Form | Foam Height, mm. | Wetting Time, min. | Surface Tension, dynes/sq. cm. |
| 1 | 15 | a 18.7 | yellow viscous liquid | 38 | 2.1 | 33.1 |
| 2 | 15 | a 12.5 | do | 36 | 1.7 | 34.1 |
| 3 | 5 | b 60.5 | yellow soft solid | 47 | 0.53 | 34.4 |
| 4 | 5 | b 30.2 | do | 48 | 0.53 | 34.2 |
| 5 | 5 | b 20.2 | do | 46 | 0.47 | 35.1 |
| 6 | 5 | c 42.3 | yellow waxy solid | 35 | 11.3 | 36.8 |
| 7 | 5 | c 21.2 | do | 43 | 7.3 | 36.0 |
| 8 | 10 | c 28.3 | do | 38 | 5.0 | 34.6 |
| 9 | 5 | f 33.8 | yellow liquid | 34 | 0.84 | 34.1 |
| 11 | 5 | f 17.0 | yellow viscous liquid | 45 | 0.57 | 34.2 |
| 12 | 10 | f 22.5 | do | 47 | 0.39 | 34.2 | a A polyoxyalkylolamine as employed in runs 1–3 of Example 1.
b A polyoxyalkylolamine as employed in runs 4–6 of Example 1.
c A polyoxyalkylolamine as employed in runs 13–15 of Example 1.
f A polyoxyalkylolamine prepared by reacting 33.42 moles of propylene oxide with one mole of monoethanolamine followed by reaction of 22.75 moles of ethylene oxide with the product to obtain a final product having a molecular weight of 2800 by nitrogen analysis.

EXAMPLE 3

A purpose of this example is to show a utility for the water-soluble ester compositions prepared in the foregoing Examples 1 and 2.

A portion of the product obtained in run No. 8 in Table I of Example 1 was dissolved in water to form a solution containing one percent by weight of the product. A mixture of 15 ml. of the aqueous solution and 15 ml. of kerosene was placed in a stoppered 2 ounce bottle and vigorously shaken. A stable emulsion was obtained. The emulsion did not separate upon standing at room temperature for 30 minutes.

Stable aqueous emulsions of kerosene in water can be prepared in similar manner employing other of the products prepared in Examples 1 and 2.

I claim:

1. A composition of matter having surface active molecular proportions of a branched chain nonyl ortho-xenoxy acetyl chloride with one gram molecular equivalent proportion of a polyoxyalkylolamine having the formula:

$$N[(C_2H_4O)_7—H]_3$$

6. A composition of matter having surface active properties, comprising a water-soluble ester consisting of the reaction product of from one to three gram molecular proportions of a branched chain nonyl ortho-xenoxy acetyl chloride with one gram molecular equivalent proportion of a polyoxyalolamine having the formula:

$$N[(C_3H_6O)_{28}—(C_2H_4O)_{15}—H]_3$$

7. A composition of matter having surface active properties, comprising a water-soluble ester consisting essentially of the reaction product of from one to three gram molecular proportions of a branched chain nonyl ortho-xenoxy acetyl chloride with one gram molecular equivalent proportion of a polyoxyalkylolamine having the formula:

$$N[(C_3H_6O)_{16}-(C_2H_4O)_{15}-H]_3$$

8. A composition of matter having surface active properties comprising a water-soluble ester consisting essentially of the reaction product of a branched chain dodecyl ortho-xenoxy acetyl chloride with one gram molecular equivalent proportion of a polyoxyalkylolamine having the formula:

$$N[(C_3H_6O)_{28}-(C_2H_4O)_{15}-H]_3$$

9. A composition of matter having surface active properties comprising a water-soluble ester consisting essentially of the reaction product of from one to three gram molecular proportions of a branched chain dodecyl ortho-xenoxy acetyl chloride with one gram molecular equivalent proportion of a polyoxyalkylolamine having the formula:

$$N[(C_3H_6O)_{11}-(C_2H_4O)_{7}-H]_3$$

References Cited in the file of this patent

UNITED STATES PATENTS

| | | |
|---|---|---|
| 1,923,178 | Ulrich et al. | Aug. 22, 1933 |
| 2,392,158 | Lacey et al. | Jan. 1, 1946 |
| 2,603,615 | Dazzi | July 15, 1952 |
| 2,752,384 | Niederhauser | June 26, 1956 |

FOREIGN PATENTS

| | | |
|---|---|---|
| 502,375 | Great Britain | Mar. 15, 1939 |